(12) United States Patent
Stastny

(10) Patent No.: US 7,509,813 B2
(45) Date of Patent: Mar. 31, 2009

(54) COMBUSTOR HEAT SHIELD

(75) Inventor: Honza Stastny, Georgetown (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 11/896,979

(22) Filed: Sep. 7, 2007

(65) Prior Publication Data
US 2008/0053103 A1 Mar. 6, 2008

Related U.S. Application Data

(63) Continuation of application No. 10/927,515, filed on Aug. 27, 2004, now abandoned.

(51) Int. Cl.
F23R 3/04 (2006.01)
(52) U.S. Cl. .......................... 60/804; 60/752
(58) Field of Classification Search ................ 60/39.37, 60/748, 752, 754, 756, 772, 804
See application file for complete search history.

(56) References Cited

U.S. PATENT DOCUMENTS

| | | |
|---|---|---|
| 2,669,090 A | 2/1954 | Jackson |
| 3,169,367 A | 2/1965 | Hussey |
| 3,608,309 A | 9/1971 | Hill et al. |
| 4,226,088 A | 10/1980 | Tsukahara et al. |
| 4,246,757 A | 1/1981 | Heberling |
| 4,475,344 A | 10/1984 | Mumford et al. |
| 4,590,769 A | 5/1986 | Lohmann et al. |
| 4,702,073 A | 10/1987 | Melconian |
| 5,129,231 A | 7/1992 | Becker et al. |
| 5,165,226 A | 11/1992 | Newton et al. |
| 5,307,637 A | 5/1994 | Stickles et al. |
| 5,398,509 A | 3/1995 | North et al. |
| 5,590,531 A | 1/1997 | Desaulty et al. |
| 5,918,467 A * | 7/1999 | Kwan .......................... 60/754 |
| 5,956,955 A | 9/1999 | Schmid |
| 6,427,446 B1 | 8/2002 | Kraft et al. |
| 7,260,936 B2 * | 8/2007 | Patel et al. .................... 60/752 |
| 2003/0213249 A1 | 11/2003 | Pacheco-Tougas et al. |

* cited by examiner

*Primary Examiner*—Louis J Casaregola
(74) *Attorney, Agent, or Firm*—Ogilvy Renault LLP

(57) ABSTRACT

A heat shield for a gas turbine engine combustor includes an apparatus for providing a spiral flow to improve at least the cooling of the heat shield.

12 Claims, 6 Drawing Sheets

COMBUSTOR HEAT SHIELD

CROSS-REFERENCE TO RELATED APPLICATIONS

This is a continuation of U.S. application Ser. No. 10/927,515 filed Aug. 27, 2004 now abandoned, the specification of which is incorporated herein by reference

TECHNICAL FIELD

The present invention relates generally to gas turbine engine combustors and, more particularly, to a low cost combustor heat shield configuration therefor.

BACKGROUND OF THE ART

Gas turbine combustors are the subject of continual improvement, to provide better cooling, better mixing, better fuel efficiency, better performance, etc. at a lower cost. For example, heat shields are known provide better protection to the combustor, but heat shields also require cooling. Although heat shield cooling schemes are known in the art, there is a continuing need for improvement.

SUMMARY OF THE INVENTION

In accordance with the present invention there is provided a gas turbine engine combustor comprising a liner enclosing a combustion chamber and a heat shield mounted inside the liner and spaced apart therefrom to define an air space between the liner and the heat shield, the liner and heat shield each having at least one opening defined therein cooperating to respectively receive a fuel nozzle, the heat shield further comprising a plurality of cooling holes defined around the at least one opening in the heat shield, the cooling holes adapted to direct air from the air space through the heat shield in a spiral around an axis of the at least one opening in the heat shield.

In accordance with another aspect there is also provided a heat shield for a gas turbine engine combustor, the heat shield comprising a heat shielding member having at least one fuel nozzle opening defined therein and means for directing cooling air through the heat shielding member in a spiral pattern around an axis of the opening.

In accordance with another aspect there is also provided a method of cooling a gas turbine combustor heat shield, the method comprising the steps of directing air to a cool side of the heat shield, and directing said air through the heat shield in a spiral around an axis of a fuel nozzle opening in the heat shield.

Further details of these and other aspects of the present invention will be apparent from the detailed description and Figures included below.

DESCRIPTION OF THE DRAWINGS

Reference is now made to the accompanying Figures depicting aspects of the present invention, in which.

DETAILED DESCRIPTION OF PREFERRED EMBODIMENTS

Figure 1:
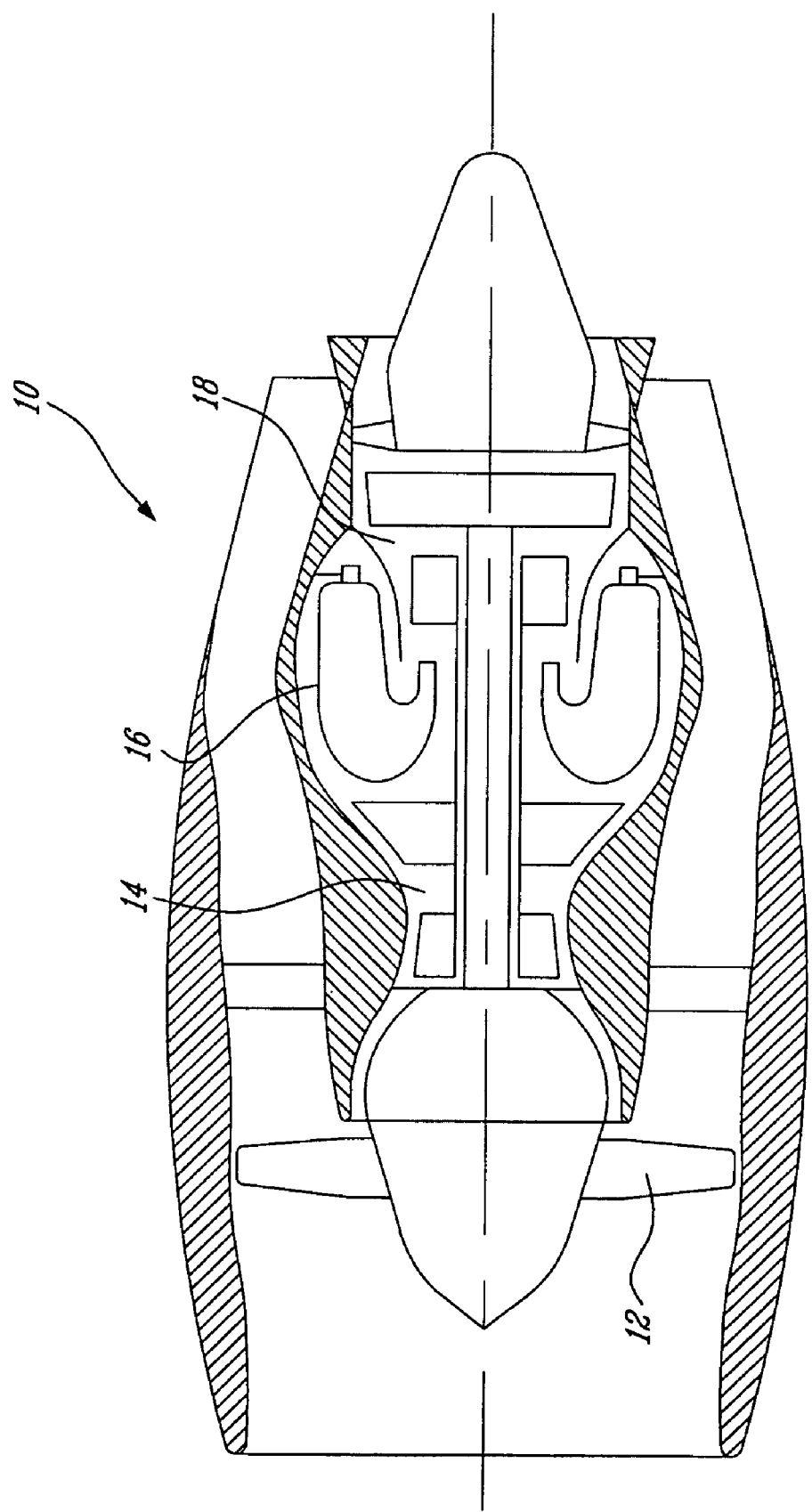
FIG. 1 shows a schematic cross-section of a turbofan engine having an annular combustor.

FIG. 1 illustrates a gas turbine engine 10 preferably of a type provided for use in subsonic flight, generally comprising in serial flow communication a fan 12 through which ambient air is propelled, a multistage compressor 14 for pressurizing the air, an annular combustor 16 in which compressed air is mixed with fuel and ignited for generating an annular stream of hot combustion gases which is then redirected by combustor 16 to a turbine section 18 for extracting energy from the combustion gases.

Figure 2:
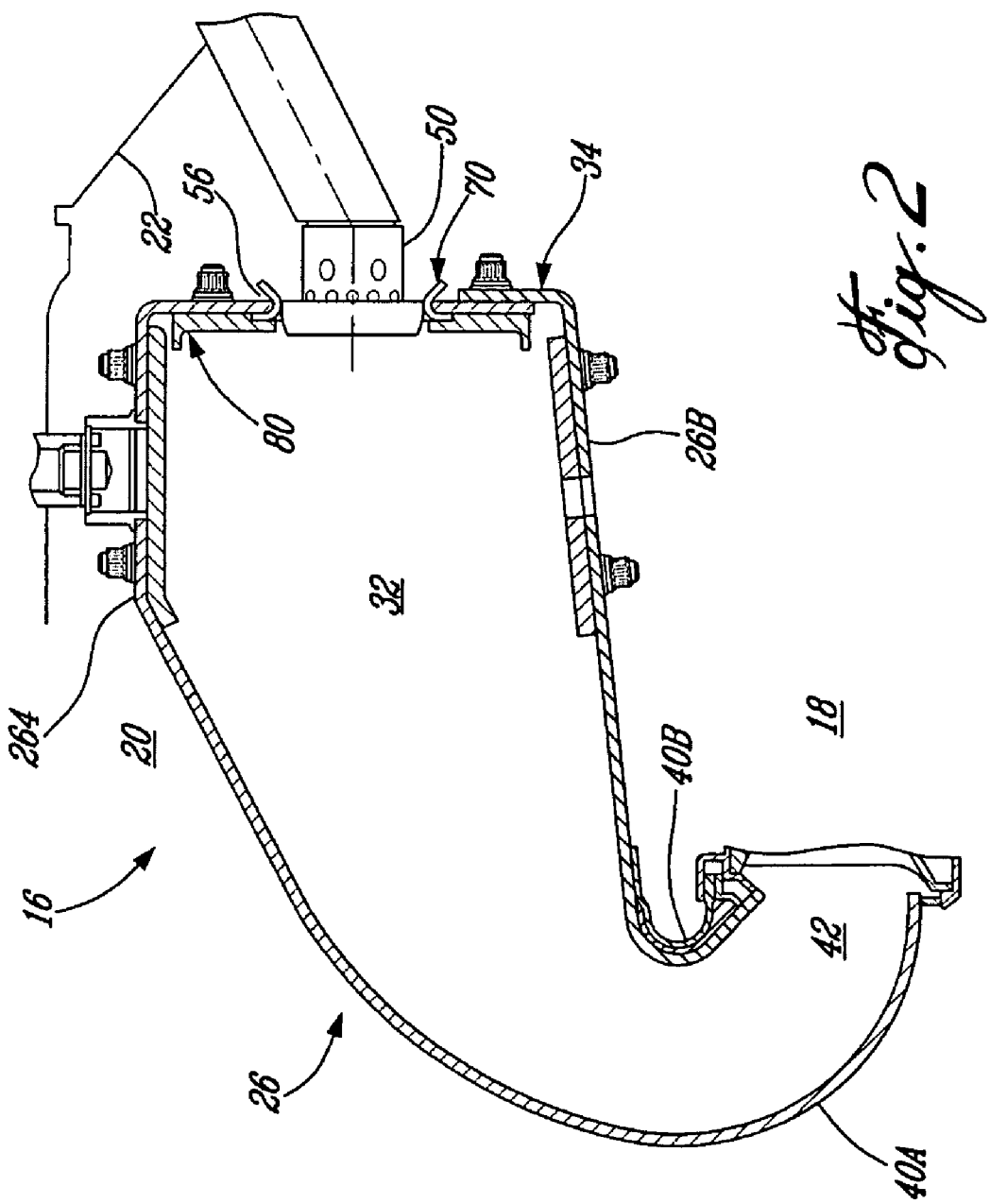
FIG. 2 shows an enlarged view of the combustor of FIG. 1.
Figure 3:
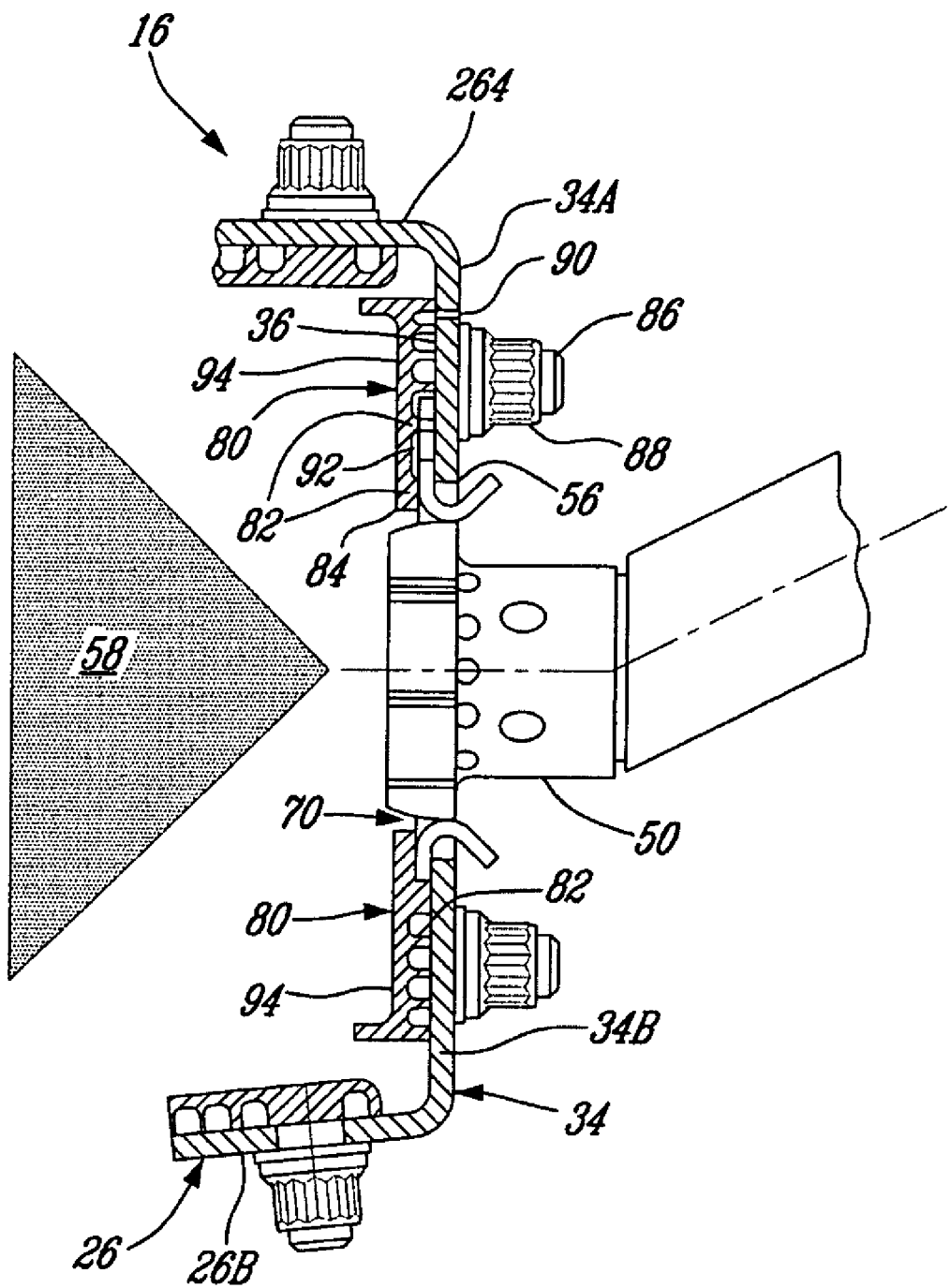
FIG. 3 shows an enlarged view of a portion of the combustor of FIG. 2.

Referring to FIGS. 2 and 3, the combustor 16 is housed in a plenum 20 defined partially by a gas generator case 22 and supplied with compressed air from compressor 14. Combustor 16 comprises generally a liner 26 composed of an outer liner 26A and an inner liner 26B defining a combustion chamber 32 therein. Combustor 16 has a dome 34, including an outer dome panel portion 34A and an inner dome panel portion 34B. The exit ducts 40A and 40B together define a combustor exit 42 for communicating with turbine section 18. A plurality of fuel nozzles 50 communicate with the combustion chamber 32 through nozzle openings 56 to deliver a fuel-air mixture 58 to the chamber 32. As depicted in FIG. 2, the fuel-air mixture is delivered in a cone-shaped spray pattern, and therefore referred to in this application as fuel spray cone 58. A conventional floating collar 70 is mounted between combustor 16 and fuel nozzle 50 to permit relative motion. Heat shields 80 are mounted against an inner surface 36 of combustor 16. Heat shields 80 are spaced-apart from surface 36, by ribs 82 and rails 83 in this example, such that air may circulate therebetween, as will be described further below. Rails 83 extend around a centrally-located circular opening 84 for receiving fuel nozzles 50. Heat shields 80 also have a plurality of threaded studs 86 for extending through combustor 26A for attachment thereto by self-locking nuts 88.

Figure 4:
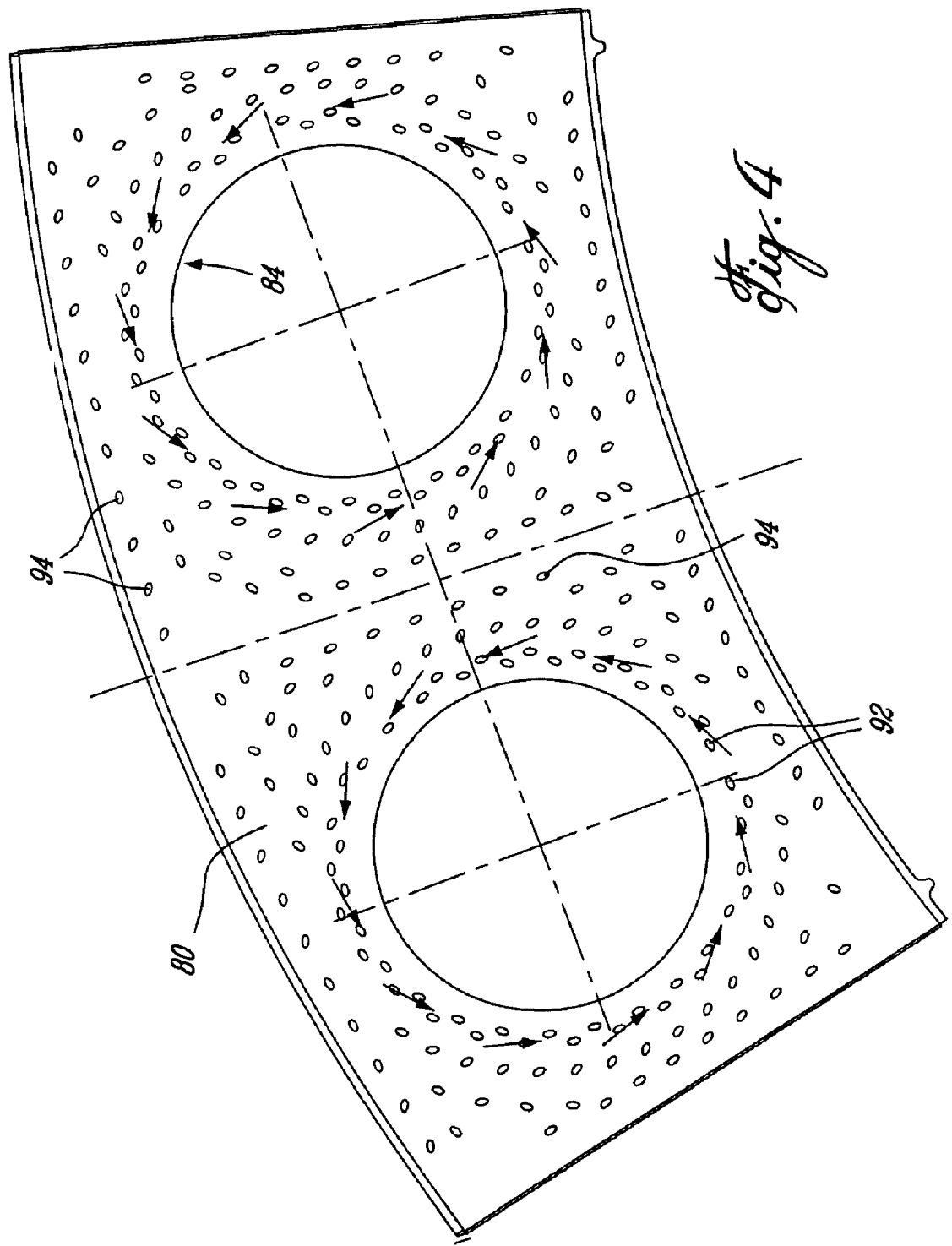
FIG. 4 shows an inside end view of the dome of the combustor of FIGS. 2 and 3.
Figure 6:
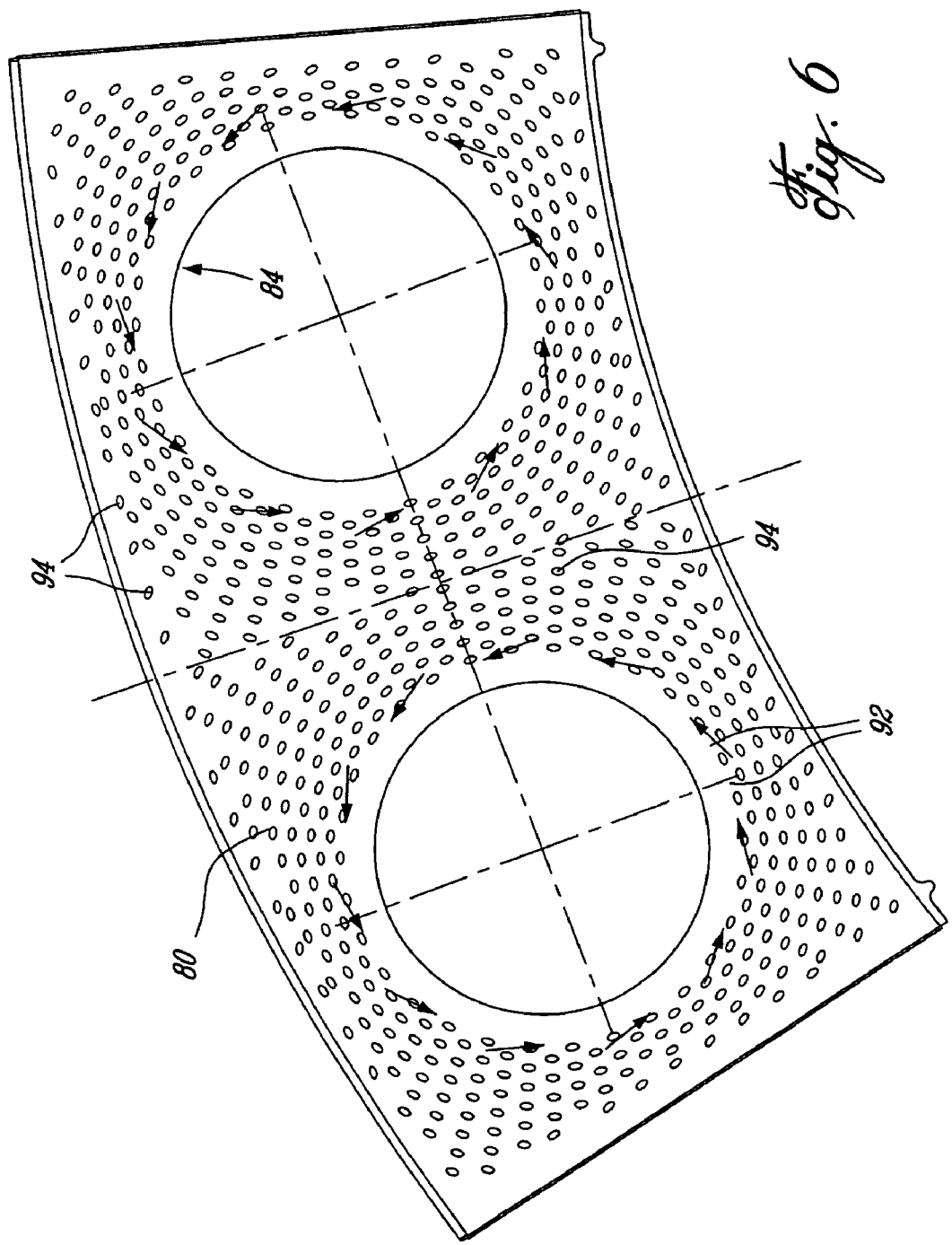
FIG. 6 shows an inside end view of the dome of the combustor in accordance with an embodiment in which the cooling holes surrounding two adjacent fuel nozzle openings are interlaced.

Referring to FIG. 3, cooling holes 90 are provided in dome 34 for admitting cooling air from outside combustor 16 into combustion chamber 32 between heat shields 80 and inner surface 36 for cooling of heat shields 80. To further enhance cooling of heat shields 80, cooling holes 92 and 94 are further provided. Referring now to FIG. 4, dome 34 includes holes 92 and 94. Holes 92 are provided preferably in a concentric circular configuration around nozzle opening 84 between rails 83, and are angled generally tangentially to opening 84 to deliver air in a circular pattern around opening 84. The entry/exit angle of holes 92 is indicated by the arrows in FIG. 4, and is noted to be generally tangential to opening 84 when viewed in this plane. Holes 94 additional effusion cooling holes provided in heat shield 80 in a conventional manner. Holes 92 are preferably provided in two concentric rings around each opening 84, however the pattern of holes 92 around openings 84 may also interlace with holes 92 from an adjacent opening 84, as shown in FIG. 6. As seen in FIG. 6, the pattern of holes 92 may also interlace with the effusion cooling holes 94.

Referring again to FIG. 2, in use, high-speed compressed air enters plenum 20. The air enters combustion chamber 32 through a plurality of holes (not shown) in liner 26. Once inside the combustor 16, the air is mixed with fuel and ignited for combustion. Combustion gases are then exhausted through exit 42 to turbine section 18. Heat shield 80 helps protect dome 34 from the head of combustion, and itself gets hot and must be cooled, as will now be described.

Figure 5:
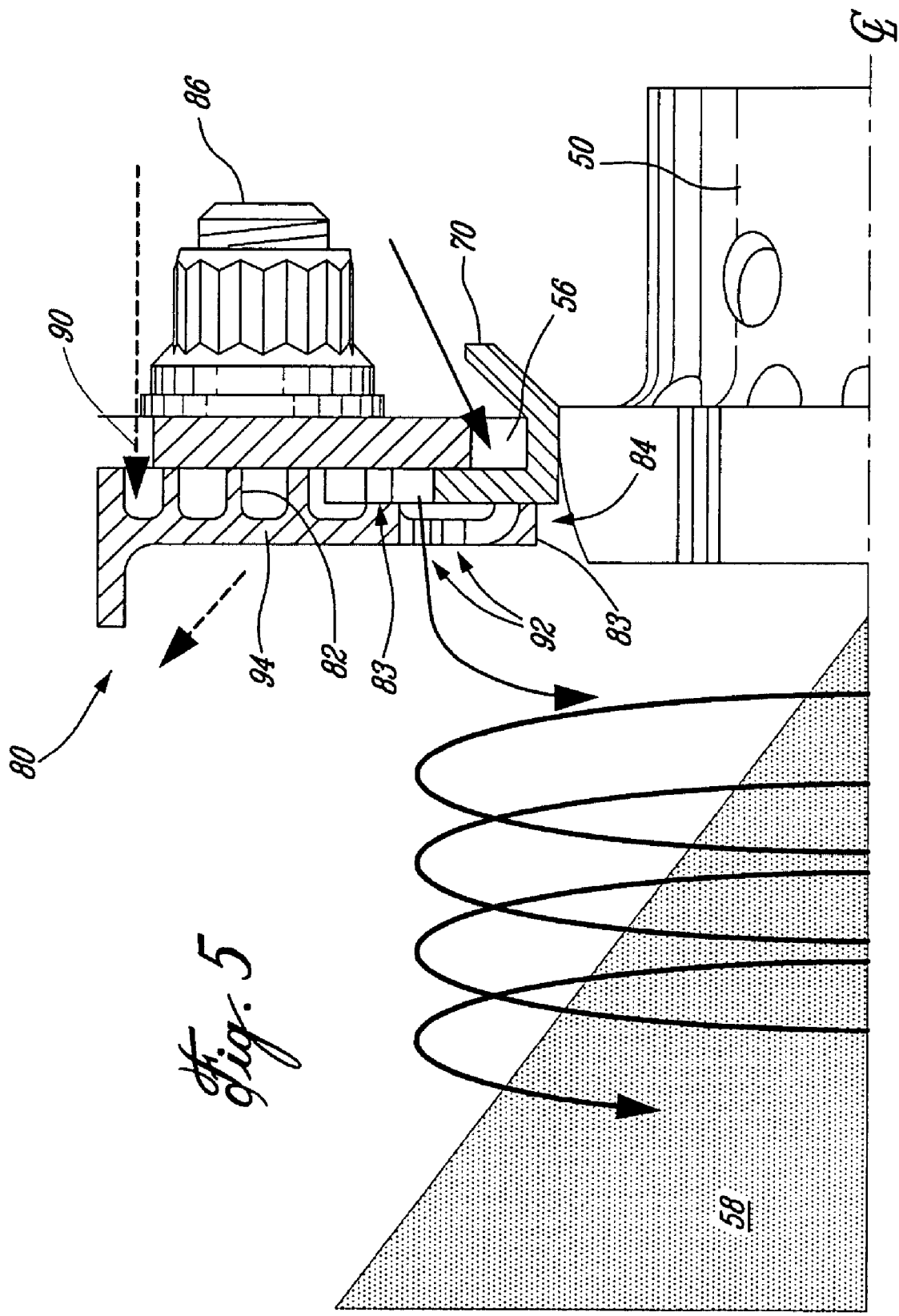
FIG. 5 is a view similar to FIG. 3, but showing only the upper half enlarged and schematically depicting the device in use.

Referring to FIG. 5, air enters cooling holes 90 into the space between heat shield 80 and inner surface 36 of combustor 16. This air (represented by the stippled arrows) travels past ribs 82, cooling them in the process, and passes through holes 94 to effusion cool heat shield 80. Air (represented by the solid arrows) also enters through opening 56, passes through floating collar 70 and into an interior space defined between ribs 83 behind heat shield 80, and is these exhausted through holes 92. Due to the arrangement of holes 92 described above, air passing through holes 92 will tend to spiral around nozzle opening 84, and will also therefore tend to create a vortex around fuel spray cone 58.

By providing a spiral flow to cooling air passing through holes 92, the cooling of heat shield 80 is enhanced. The spiral flow assists in cooling the radially innermost rail 83 (i.e. the rail defining opening 84), thereby impeding oxidation and distortion of this rail. The present invention therefore provides improved cooling over the prior art, but adds no additional cost or weight since cooling holes are simply reoriented to provide improved cooling.

Additionally, the spiral cooling hole pattern of the present invention can also help to improve mixing in the combustor and may also help constrain the lateral extent of fuel spray cone 58. The spiral flow inside the liner provides better fuel/air mixing and thus also improves the re-light characteristic of the engine, because the spiral flow 'attacks' the outer shell of the fuel spray cone, which is consists of the lower density of fuel particles, and thus improves fuel-air mixing in the combustion chamber. The vortex around the fuel nozzle, depending on its strengths, can also help to constrain the lateral extent of the fuel spray cone 58 and help keep combustion away from liner 26.

The present invention, therefore, provides improved performance over the prior art with little or no added cost, weight or complexity.

The above description is meant to be exemplary only, and one skilled in the art will recognize that further changes may be made to the embodiments described without departing from the scope of the invention disclosed. For example, the invention may be provided in any suitable heat shield configuration and in any suitable combustor configuration, and is not limited to application in turbofan engines. It will also be understood that holes 92 need not be provided in a concentric circular configuration, but in any suitable pattern which results in a spiraling flow around the nozzle. Holes 94 and 92 need not be provided in distinct regions of the dome 34, and may instead be interlaced in overlapping regions. Holes 92 around adjacent nozzle openings 84 may likewise be interlaced with one another. The direction of vortex flow around each nozzle is preferably in the same direction, though not necessarily so. Each heat shield does not require spiral holes 92, though it is preferred. The manner is which an air space is maintained between the heat shield and the combustor liner need not be provided on the heat shield, but may also or alternatively be provided on the liner and/or additional means provided either therebetween or elsewhere. Still other modifications will be apparent to those skilled in the art, in light of a review of this disclosure, and such modifications are intended to fall within the appended claims.

I claim:

1. A gas turbine engine combustor comprising a liner enclosing a combustion chamber and a heat shield mounted inside the liner and spaced apart therefrom to define an air space between the liner and the heat shield, the liner and heat shield each having at least one opening defined therein cooperating to respectively receive a fuel nozzle, the heat shield further comprising a plurality of cooling holes defined around the at least one opening in the heat shield, the cooling holes adapted to direct air from the air space through the heat shield in a spiral around an axis of the at least one opening in the heat shield, and the heat shield including a region wherein at least some cooling holes associated with a first fuel nozzle opening are interlaced with at least some cooling holes associated with a second fuel nozzle opening in the heat shield.

2. The combustor of claim 1 wherein the heat shield opening axis is generally aligned with a fuel injection axis of the fuel nozzle.

3. The combustor of claim 1 wherein the cooling holes are restricted to a region immediately adjacent the heat shield opening.

4. The combustor of claim 1 wherein the cooling holes are disposed substantially circumferentially around the heat shield opening.

5. The combustor of claim 1 wherein the cooling holes are disposed in a plurality of rows around the heat shield opening.

6. The combustor of claim 1 wherein the heat shield includes at least a second region wherein said at least some cooling holes associated with the first fuel nozzle opening are interlaced with a second set of cooling holes, said second set of cooling holes adapted to direct a non-spiraling flow of air through the heat shield.

7. The combustor of claim 1 wherein the cooling holes are angled to direct air through the heat shield generally tangentially relative to the opening.

8. A heat shield for a gas turbine engine combustor, the heat shield comprising a heat shielding member having a plurality of fuel nozzle openings defined therein and means for directing cooling air through the heat shielding member in a spiral pattern around an axis of each of the openings, said means of adjacent ones of said fuel nozzle openings being interlaced.

9. The heat shield of claim 8 wherein the means for directing comprises means for directing said cooling air generally tangentially relative the opening.

10. The heat shield of claim 8 wherein the means for directing is disposed substantially around the opening.

11. The heat shield of claim 8 wherein the means for directing is provided in a generally planar portion of the heat shield.

12. The heat shield of claim 8, wherein the heat shielding member includes at least a region therein where said means for directing is interlaced with a second means for directing cooling air through the heat shielding member in a non-spiraling pattern of air flow through the heat shield.

* * * * *